(12) United States Patent
Shibasaki et al.

(10) Patent No.: US 9,052,576 B2
(45) Date of Patent: Jun. 9, 2015

(54) PROJECTION APPARATUS WHICH ADJUSTS POWER TO LIGHT-EMITTING DEVICES TO CORRECT A DECREASE IN LUMINANCE DUE TO HEAT GENERATION, AND PROJECTION METHOD AND PROGRAM FOR THE SAME

(75) Inventors: Mamoru Shibasaki, Tachikawa (JP); Hideo Suzuki, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 538 days.

(21) Appl. No.: 12/720,820

(22) Filed: Mar. 10, 2010

(65) Prior Publication Data
US 2010/0231864 A1    Sep. 16, 2010

(30) Foreign Application Priority Data

Mar. 12, 2009    (JP) ................................. 2009-059672

(51) Int. Cl.
*G03B 21/00* (2006.01)
*G03B 21/14* (2006.01)
*G09G 3/34* (2006.01)
(Continued)

(52) U.S. Cl.
CPC .............. *G03B 21/14* (2013.01); *G09G 3/3413* (2013.01); *G09G 2310/0235* (2013.01); *G09G 2320/0633* (2013.01); *G09G 2360/145* (2013.01); *H04N 9/3111* (2013.01); *H04N 9/3182* (2013.01); *H04N 9/3194* (2013.01); *H04N 9/3197* (2013.01); *H05B 33/0851* (2013.01); *H05B 33/0854* (2013.01)

(58) Field of Classification Search
CPC .......... G03B 21/2013; G03B 21/2033; G09G 2320/066; G09G 2320/0666; G09G 2320/041; G09G 2320/0626; G09G 3/3413
USPC .......................... 353/31, 52, 85; 362/552, 555
See application file for complete search history.

(56) References Cited

U.S. PATENT DOCUMENTS

| 6,313,816 | B1 * | 11/2001 | Kojima et al. .................. 345/83 |
| 7,728,808 | B2 | 6/2010 | Kim | |
| 2005/0110955 | A1 * | 5/2005 | Trollsch et al. ................. 353/31 |

(Continued)

FOREIGN PATENT DOCUMENTS

| JP | 06294755 A | 10/1994 |
| JP | 2004-140800 A | 5/2004 |

(Continued)

OTHER PUBLICATIONS

Japanese Office Action dated Nov. 27, 2012 (and English translation thereof) in counterpart Japanese Application No. 2009-059672.

(Continued)

*Primary Examiner* — Sultan Chowdhury
*Assistant Examiner* — Danell L Owens
(74) *Attorney, Agent, or Firm* — Holtz, Holtz, Goodman & Chick PC

(57) ABSTRACT

There is provided a projection apparatus including a plurality of light-emitting devices for respectively emitting lights of a plurality of colors, a projecting unit for forming an optical image of a plurality of color components for each frame and sequentially projecting the optical image, and a power control unit for adjusting power to be supplied to the plurality of light-emitting devices to correct a decrease in luminance due to heat generation of the plurality of light-emitting devices.

9 Claims, 7 Drawing Sheets

(51) Int. Cl.
*H04N 9/31* (2006.01)
*H05B 33/08* (2006.01)

(56) References Cited

U.S. PATENT DOCUMENTS

| | | | |
|---|---|---|---|
| 2005/0242742 A1* | 11/2005 | Cheang et al. | 315/149 |
| 2008/0094579 A1* | 4/2008 | Fujinawa et al. | 353/52 |
| 2008/0245949 A1* | 10/2008 | Morimoto et al. | 250/205 |
| 2009/0015525 A1 | 1/2009 | Hosaka et al. | |
| 2009/0128451 A1* | 5/2009 | Tokui | 345/55 |

FOREIGN PATENT DOCUMENTS

| | | |
|---|---|---|
| JP | 2005157387 A | 6/2005 |
| JP | 3781743 B2 | 3/2006 |
| JP | 2007-095391 A | 4/2007 |
| JP | 2007-294385 | 11/2007 |
| JP | 2008-185924 | 8/2008 |
| JP | 2009020384 A | 1/2009 |
| JP | 2009020385 A | 1/2009 |
| JP | 2009-047926 A | 3/2009 |
| JP | 2009-048131 A | 3/2009 |
| WO | WO 2007/023681 A1 | 3/2007 |

OTHER PUBLICATIONS

Korean Office Action dated Jun. 25, 2013 (and English translation thereof) in counterpart Korean Application No. 10-2010-0021173.

Japanese Office Action dated Jul. 8, 2014, issued in counterpart Japanese Application No. 2013-118768.

* cited by examiner

PROJECTION APPARATUS WHICH ADJUSTS POWER TO LIGHT-EMITTING DEVICES TO CORRECT A DECREASE IN LUMINANCE DUE TO HEAT GENERATION, AND PROJECTION METHOD AND PROGRAM FOR THE SAME

CROSS-REFERENCE TO RELATED APPLICATIONS

This application is based upon and claims the benefit of priority from prior Japanese Patent Application No. 2009-059672, filed Mar. 12, 2009, the entire contents of which are incorporated herein by reference.

BACKGROUND OF THE INVENTION

1. Field of the Invention

The invention relates to a projection apparatus, a projection method, and a storage medium storing program code, suitable to a projector in which a light source such as a light-emitting diode is used.

2. Description of the Related Art

Conventionally, so-called color sequential system or field sequential system projectors are planed and commercialized. In the projector, color images of plural colors are continuously projected while changed at high speed, and human eyes can perceive the color images.

Particularly, in the projector in which an LED is used as a light source, there is proposed a technique of simultaneously lighting some of the red (R), green (G), and blue (B) color LEDs in order to secure a light quantity, as disclosed by Japanese Patent No. 3781743.

FIG. 7 illustrates an example of a luminance of Red LED (hereinafter referred to as "R-LED") when one image frame is divided into three fields each of which an image of each of RGB colors is projected to. FIG. 7 (1) illustrates each color image formation timing (field) of the image of each color in a digital micromirror device (DMD) (registered trademark) that is a projection optical image forming device.

FIG. 7 (2) illustrates a current value that is set to be passed through the R-LED in each of the R, G, and B fields in FIG. 7 (1). As illustrated in FIG. 7 (2), a full-level current value is passed through the R-LED in the R field, and a current value larger than a half of the full level is also passed through the R-LED in the subsequent G field.

FIG. 7 (3) illustrates a light quantity of red light actually emitted from the R-LED that is the light source. As illustrated in FIG. 7 (3), the R-LED generates heat because the full-level current value is passed through the LED in the R field period. An amount of luminescence decreases rapidly by the influence of the heat generation immediately after the LED is lit. Subsequently, heat generation is saturated gradually and then the amount of luminescence decreases gradually.

Then, because the setting current value passed through the R-LED decreases largely from the full level in the G field, the amount of luminescence decreases largely immediately after the field changes. After that, the amount of luminescence rises gradually as the amount of heat generation decreases in the R-LED by the decrease in setting current value.

In the subsequent B field, because the current value of the R-LED is set to "0 (zero)", the amount of luminescence becomes "0".

Although not illustrated, similarly the actual amount of luminescence fluctuates with respect to the setting current value by the influence of the heat generation in the green (G) LED and blue (B) LED that constitute the light source.

Moreover, the amount of luminescence fluctuates not only in the case in which the LED is used as the light source but also in the case in which a semiconductor laser is used as the light source, and the amount of luminescence changes in each field by the influence of the heat generation even if the semiconductor laser is driven with setting current value.

In the projector in which the LED or the semiconductor laser is used as the light source, even if the light source is driven with a previously set power, the amount of luminescence fluctuates by the influence of the heat generation of the light source. This results in a problem in that projection image quality degrades.

It is an object of the invention to provide a projection apparatus, a projection method, and a program, capable of preventing the influence of the thermal fluctuation of the light source to maintain the projection image quality at a higher level.

BRIEF SUMMARY OF THE INVENTION

According to one aspect of the invention, there is provided a projection apparatus comprising: a plurality of light-emitting devices for respectively emitting lights of a plurality of colors; a projecting means for forming an optical image of a plurality of color components for each frame and sequentially projecting the optical image; and a power control means for adjusting power to be supplied to the plurality of light-emitting devices to correct a decrease in luminance due to heat generation of the plurality of light-emitting devices.

According to another aspect of the invention, there is provided a projection method applied to a projection apparatus including a plurality of light-emitting devices for respectively emitting lights of a plurality of colors, and a projecting means for forming an optical image of a plurality of color components for each frame and sequentially projecting the optical image, the method comprising: adjusting power to be supplied to the plurality of light-emitting devices to correct a decrease in luminance due to heat generation of the plurality of light-emitting devices.

According to still another aspect of the invention, there is provided a storage medium storing program code to be executed by a computer built in a projection apparatus including a plurality of light-emitting devices for respectively emitting lights of a plurality of colors, and a projecting means for forming an optical image of a plurality of color components for each frame and sequentially projecting the optical image, the program code comprising: adjusting power to be supplied to the plurality of light-emitting devices to correct a decrease in luminance due to heat generation of the plurality of light-emitting devices.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments of the invention will be described below with reference to the drawings. It is to be noted that the scope of the invention is not limited to the embodiments described below and exemplary drawings thereof while various sorts of technically preferred limitations are provided in the embodiments.

First Embodiment

A data projector according to a first embodiment of the invention in which an LED is used as the light source will be described with reference to the drawings.

Figure 1:
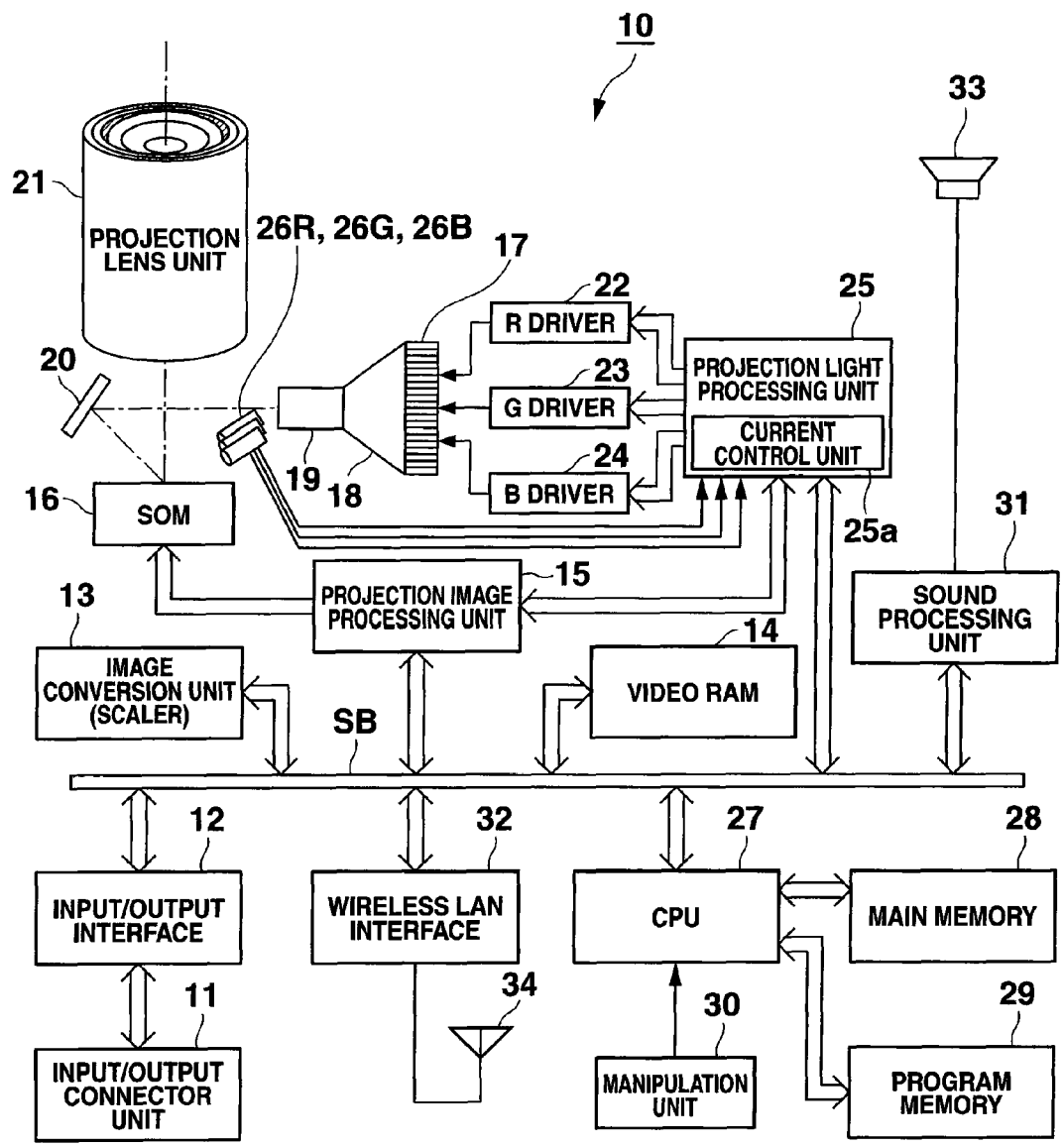
FIG. 1 is a block diagram illustrating a schematic configuration of a functional circuit of a data projector according to a first embodiment of the invention.

FIG. 1 is a block diagram illustrating a schematic functional configuration of an electronic circuit included in a data projector 10 of the first embodiment.

An input/output connector unit 11 includes a pin jack (RCA) type video input terminal, a D-sub 15 type RGB input terminal, and a Universal Serial Bus (USB) connector.

The input/output connector unit 11 feeds image signals pursuant to various standards into an image conversion unit 13 also called a scaler through an input/output interface 12 and a system bus SB. The image conversion unit 13 standardizes the fed image signals into image signals having a predetermined format suitable to the projection, and transmits the image signals to a projection image processing unit 15 after storing, as needed, the image signals in a video RAM 14 that is a buffer memory for display.

At this point, the video RAM 14 superimposes items of data such as symbols indicating various operation states for on-screen display (OSD) on the image signals if needed, and transmits the superimposing image signals to the projection image processing unit 15.

In response to the transmitted image signals, the projection image processing unit 15 displays and drives a micromirror device 16 that is a spatial optical modulator (SOM) at a frame rate in a predetermined format, by high-speed time-sharing drive, in which the number of divided color components and the number of display gray scales are multiplied.

In the micromirror device 16, the on/off operation is individually performed to inclined angles of plural (for example, XGA (1024-by-768)) arrayed micromirrors, whereby an optical image is formed by reflecting light on each micromirror.

An LED array 17 is used as the light source of the data projector 10. In the LED array 17, many LEDs each of which emits light of each of the RGB colors are arrayed so as to be regularly mixed.

The light of each color component emitted in a time-sharing manner by the LED array 17 is collected by a truncated pyramid housing 18 in which a reflecting mirror is bonded to a whole inner surface, an integrator 19 forms a light flux having a uniform luminance distribution, and then a mirror 20 totally reflects the light. Then the micromirror device 16 is irradiated with the light.

The optical image is formed by the light reflected from the micromirror device 16, and the formed optical image is projected through a projection lens unit 21 onto a screen (not illustrated) that is a projection target.

In the LED array 17, an R driver 22, a G driver 23, and a B driver 24 drive and control LED groups of corresponding colors, thereby emitting RGB primary colors in a time-sharing manner.

A projection light processing unit 25 includes a current control unit 25a to control light-emission timing and a drive current of each of the R driver 22, G driver 23, and B driver 24 according to image data provided from the projection image processing unit 15.

The projection light processing unit 25 receives detection signal of each of illuminance sensors 26R, 26G, and 26B, which detects brightness of each color of the optical image formed by the micromirror device 16. The current control unit 25a controls the current values and waveforms thereof, which are supplied to the R driver 22, G driver 23, and B driver 24, based on the brightness detected by each of the illuminance sensors 26R, 26G, and 26B.

A CPU 27 controls all operations of the circuits. The CPU 27 is connected to a main memory 28 and a program memory 29. The main memory 28 includes a DRAM to act as a work memory. The program memory 29 includes an electrically-rewritable nonvolatile memory in which an operating program, various kinds of fixed data, plural items of LED driving current waveform information are stored. The CPU 27 performs the control operation of the whole data projector 10 using the main memory 28 and the program memory 29.

The CPU 27 performs various projection operations in response to a key manipulation signal from a manipulation unit 30. The manipulation unit 30 includes a key manipulation unit that is provided in a main body of the data projector 10 and a laser beam receiving unit that receives an infrared ray from a remote controller (not illustrated) dedicated to the data projector 10. The manipulation unit 30 directly outputs the key manipulation signal to the CPU 27 based on a key that is directly manipulated or manipulated through remote controller by a user.

The CPU 27 is also connected to a sound processing unit 31 and a wireless LAN interface (I/F) 32 through the system bus SB.

The sound processing unit 31 includes a sound source circuit such as a PCM sound source. The sound processing unit 31 converts sound data provided during the projection operation into analog data, and drives a speaker unit 33 to produce sounds or to generate a beep sound if needed.

The wireless LAN interface 32 transmits and receives data to and from an external device (not illustrated) such as a personal computer through a wireless LAN antenna 34 using a radio wave of 2.4-GHz band according to, for example, IEEE 802.11b/g standard.

An operation of the first embodiment will be described.

First a basic concept of control in the first embodiment will be described with reference to FIG. 2.

Figure 2:
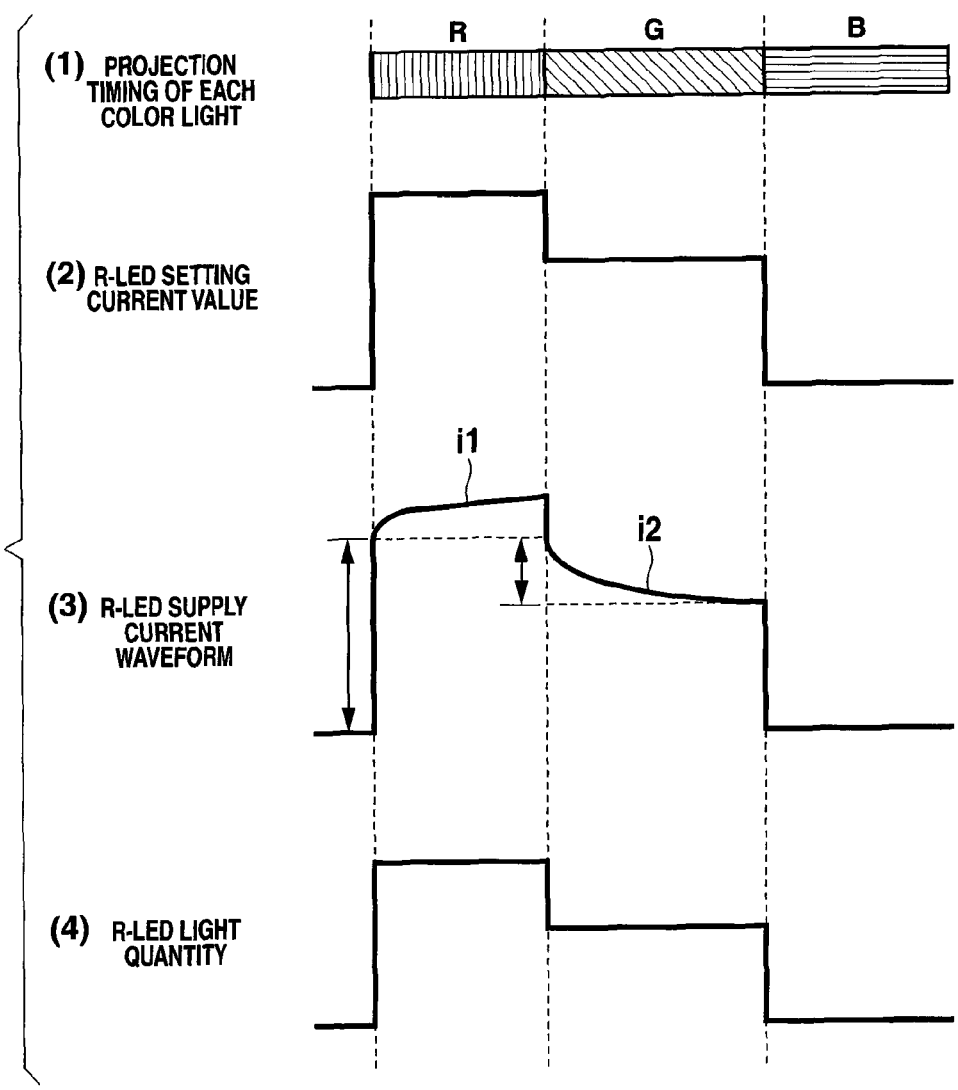
FIG. 2 illustrates a control principle of a current-value-adjusted waveform of the first embodiment.

FIG. 2 illustrates a luminance of a Red LED (hereinafter referred to as "R-LED") partially constituting the LED array 17 when one image frame is divided into three fields each of which the image of each of the RGB colors is projected to. FIG. 2 (1) illustrates formation timing (field) of the image of each color in the micromirror device 16.

FIG. 2 (2) illustrates a reference current value that is set to be passed through the R-LED in each of the R, G, and B fields. As illustrated in FIG. 2 (2), a full-level current value is passed through the R-LED in the R field. On the other hand, a current value larger than a half of the full level is also passed through the R-LED in the G field. In this manner, the R-LED is lit by a current smaller than the full-level current in the G and B fields in which ordinarily the R-LED is not lit. By driving the R-LED as described above, an arbitrary hue can be adjusted while a higher luminance is obtained. It is assumed that the similar lighting control is performed to a G-LED and a B-LED.

FIG. 2 (3) illustrates a waveform of the current value that is actually supplied to the R-LED as the light source by the R driver 22. As illustrated in FIG. 2 (3), the light quantity that is to be lowered by the heat generation in the R-LED is previously predicted, and a current waveform capable of cancelling the lowered light quantity is supplied. Namely, for example, in the R field, a waveform i1 in which the current value increases by the lowered light quantity due to heat generation in addition to the ordinary current value as shown in FIG. 2 (2) is supplied to the R-LED.

Even in the subsequent G field, the current value is controlled such that a waveform i2 in which the current value increases by the lowered light quantity due to heat generation in addition to the ordinary current value is supplied.

In the data projector 10 of the first embodiment, for example, the R-LED is continuously lit by changing the current value in each of the R, G, and B fields. Thus, actually, the amount of heat generation in each of the R, G, and B fields takes over the influence of the heat generated in the preceding field. In view of such phenomenon, the current value waveform shown in FIG. 2 (3) may be controlled such that a correction value is gradually increased based on an elapsed time from the starting of projection. In this case, for example, a correction factor of the current waveform corresponding to the number of fields may be previously stored. By doing this, it becomes possible to supply to each LED a current waveform that is adjusted in consideration of the influence of the amount of heat, which is generated in a previous field prior to own field, and accumulated. As a result, each LED can be lit with more adequate luminance.

The current waveforms are fixed data previously stored in the program memory 29. The CPU 27 reads the fixed data, expands and stores the fixed data in the main memory 28, transmits the fixed data to the projection light processing unit 25, and the current control unit 25a supplies fixed data to the R driver 22.

FIG. 2 (4) illustrates a light quantity of actual red light that is emitted from the R-LED as a result of the drive of the R-LED with the current value having the waveform. As illustrated in FIG. 2 (4), the influence of the heat generation can be cancelled to maintain the constant light quantity in each of the R, G, and B field periods.

In consideration of the decrease in light quantity by the heat generation of the LED, the LED is driven with the current value of the waveform that cancels the decreased light quantity. As a result, the LED can emit the light with the stable light quantity in each field period.

The above-described control is performed not only to the R-LED partially constituting the LED array 17 but also to the G-LED and B-LED.

Additionally, the current value waveform for each of the R-, G-, and B-LEDs depends on a projection color mode. That is, data of information on the current value waveform for driving each of the R-, G-, and B-LEDs is previously stored in the program memory 29 for each of the plural projection color modes. When the projection color modes such as a "theater mode" in which the hue is valued and a "presentation mode" in which the luminance is valued are previously prepared in a selectable manner, the current value waveform stored in the program memory 29 is adjusted such that the luminance obtained in the "presentation mode" is higher than that of the "theater mode".

A projection operation of the data projector 10, that is, the control of each of the R-, G-, and B-LED groups constituting the LED array 17 will mainly be described with reference to FIG. 3.

Figure 3:
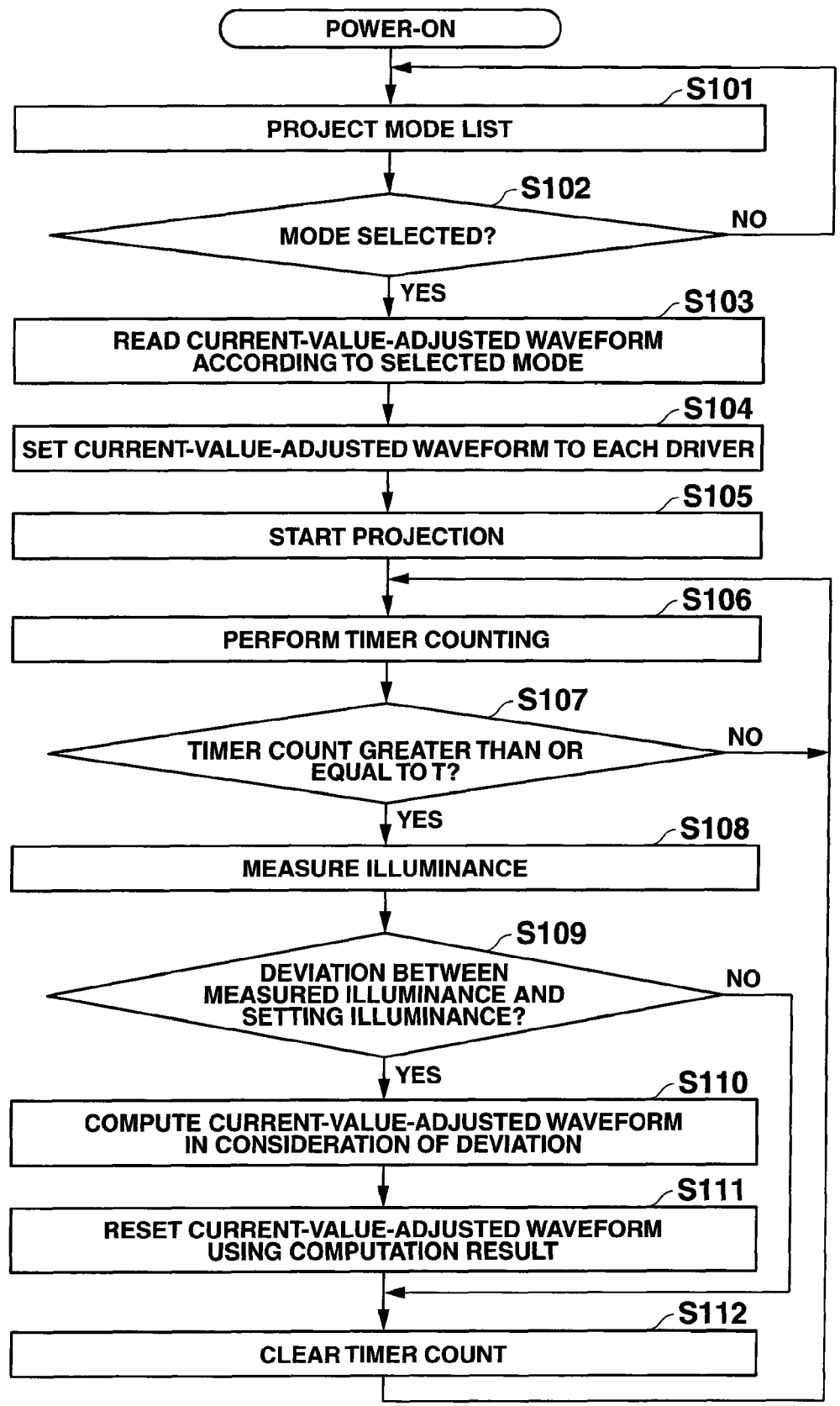
FIG. 3 is a flowchart illustrating processing of a projection operation including current value waveform adjustment of the first embodiment.

FIG. 3 partially illustrates the projection operation in which, after the data projector 10 is powered on, the CPU 27 reads and expands the operating program stored in the program memory 29 and stores the operating program in the main memory 28 to execute the operating program.

At first, before the projection of the input image, names of various projection color modes, such as the "theater mode" and the "presentation mode", which express a relationship between the hue and the luminance of the whole projection image are projected as a list image (Step S101).

The CPU 27 determines whether the manipulation for selecting one of the projected modes is performed with the manipulation unit 30 (Step S102). When the manipulation is not performed, the flow returns to Step S101. The processing in Steps S101 and S102 is repeated, and the CPU 27 waits for one of the projection color modes to be selected while the projection color modes are projected as the list.

When one of the projection color modes is selected, the CPU 27 determines the manipulation (Step S102), and selectively reads information on the current value waveform for each of the R-, G-, and B-LEDs from the program memory 29 according to the selected mode to expand the information on the current value waveform (Step S103). The CPU 27 stores the information on the current value waveform in the main memory 28, and sets the information on the current value waveform to the current control unit 25a of the projection light processing unit 25 in order to control the R driver 22, G driver 23, and B driver 24 (Step S104). It is to be noted that the information on the current value waveform is a value that is previously stored in order to cancel the decrease in light quantity caused by the LED heat generation in starting the projection, as described above.

After the current value waveform is set as described above, the LED array 17 is driven by the R driver 22, G driver 23, and B driver 24 according to the current value waveform set to the current control unit 25a. Simultaneously, the projection operation of the image signal fed through the input/output connector unit 11 or the wireless LAN antenna 34 is started (Step S105).

When the data projector 10 continuously performs the projection operation, as described above, the amount of heat generation in each field of the LED light source is affected by the heat generation in the previous field. That is, cooling due to the time-sharing drive cannot make it in time as time passes from the starting of projection, and the amount of heat generation is gradually accumulated through the projection frames.

Accordingly, although the current value waveform that cancels the decrease in light quantity caused by the LED heat generation is set to the R driver 22 to control the lighting of each LED in Step S104, the light quantity may further decrease because the amount of heat generated in each field is accumulated by the continuous projection operation. That is, since the decreased light quantity gradually increase as the projection operation is continued, there is a possibility that the decrease in light quantity cannot be cancelled by the current value waveform set in Step S104.

In order to resolve such a problem, as described above, a correction value for the setting current value corresponding to a passing time of the projection may be previously stored. However, this method may not be the best way because the accumulation of the amount of heat generation is swayed by the usage environment of the projector, frequency of usage, individual difference, and the like.

Therefore, it is necessary that the current value waveform be reset to the current control unit 25a based on an actual measurement such that the further decrease in light quantity caused by the accumulation of the amount of heat generation can be canceled at constant time intervals, for example.

The CPU 27 causes a timer set in the main memory 28 to start counting according to the starting of the projection operation (Step S106). The timer counts a constant time T, for example, 30 minutes that is a measurement interval of thermal fluctuation generated with the progression of the projection operation in each of the R-, G-, and B-LED groups constituting the LED array 17. According to the counting of the timer, the CPU 27 determines whether the count becomes the constant value T (Step S107).

When the count of the timer does not reach the constant value T, the flow returns to the processing from Step S106. Then, the processing in Steps S106 and S107 is repeated while the projection operation is performed, whereby the CPU 27 waits for the count of the timer to become the constant value T.

When the count of the timer reaches the constant value T in Step S107, the illuminance sensors 26R, 26G, and 26B measure the illuminances of the R-, G-, and B-LED groups constituting the LED array 17 (Step S108).

During the measurement of the illuminance, in the optical image formed by the micromirror device 16, full gray scale may be realized in all the pixels by one frame or two frames for the R, G, and B optical images according to the measurement timing. Even if only one frame or two frames in 60 frames per second are projected with the full gray scale for each field, because human eyes hardly perceive the one frame or two frames with the full gray scale, the projection image quality is not degraded.

As a result of the measured illuminance, the projection light processing unit 25 determines whether a deviation exists between the measured illuminance and the setting illuminance in each of the R-, G-, and B-LED groups (Step S109).

When the deviation does not exist between the measured illuminance and the setting illuminance in each of the R-, G-, and B-LED groups, the CPU 27 clears the count of the timer (Step S112). Then the flow returns to the processing from Step S106.

When the deviation exists between the measured illuminance and the setting illuminance in each of the R-, G-, and B-LED groups in Step S109, the CPU 27 computes the current-value-adjusted waveform in consideration of the deviation such that the desired illuminance is realized (Step S110).

Then the CPU 27 reads the information corresponding to the computed current-value-adjusted waveform from the program memory 29, and resets the information to the current control unit 25a of the projection light processing unit 25 (Step S111).

Figure 4:
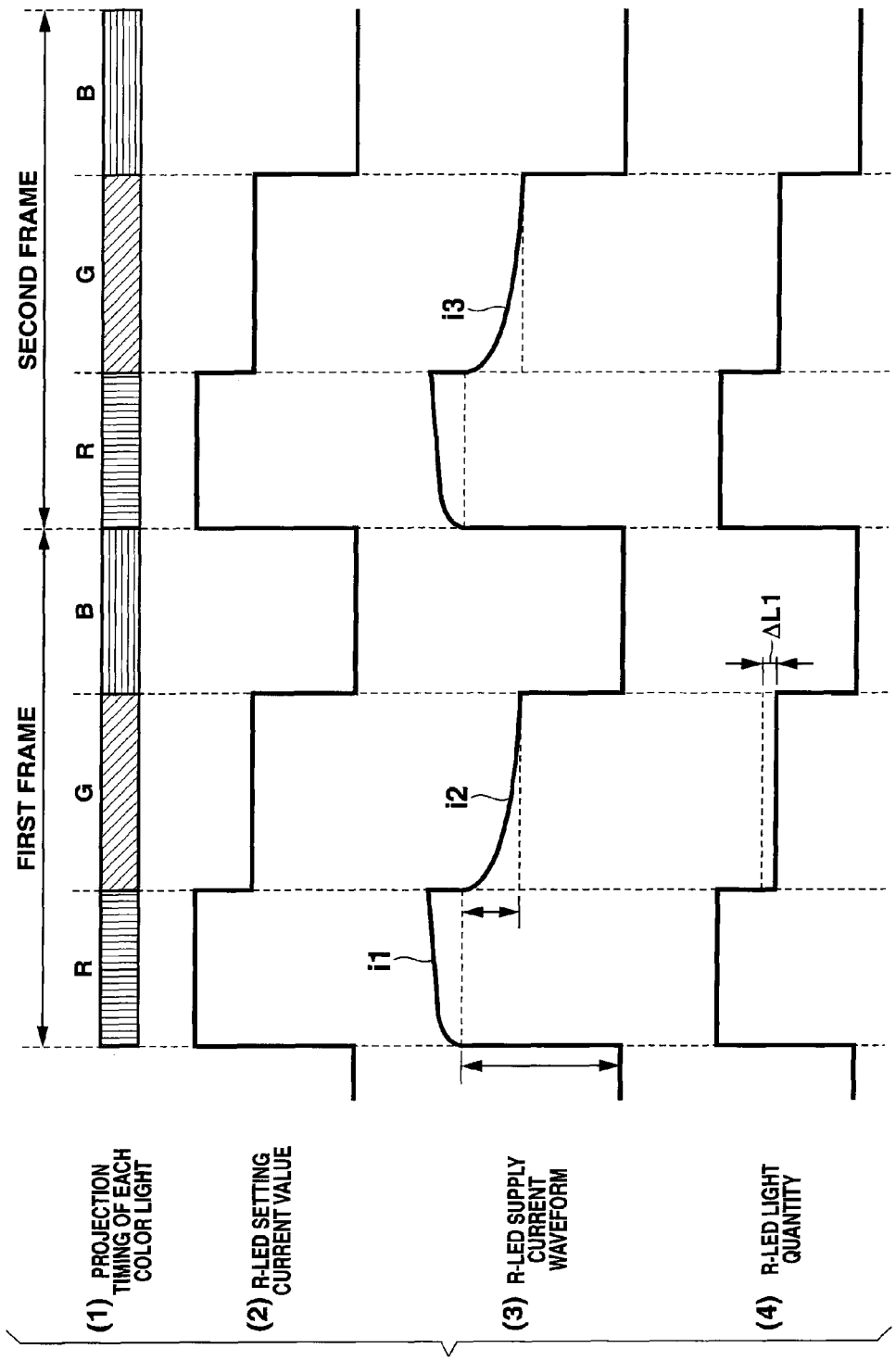
FIG. 4 illustrates a control operation example of the current-value-adjusted waveform of the first embodiment.

FIG. 4 illustrates luminance of the R-LED in a period of two image frames before and after the processing in Steps S110 and S111. FIG. 4 (1) illustrates formation timing (field) of each color (R, G, and B) image in the micromirror device 16.

FIG. 4 (2) illustrates a reference current value that is set to be passed through the R-LED in each of the R, G, and B fields through two frames in order to obtain the target light quantity. As illustrated in FIG. 4 (2), a full-level current value is passed through the R-LED in the R field. On the other hand, a current value larger than a half of the full level is passed through the R-LED in the G field.

FIG. 4 (3) illustrates a waveform of the current value that is actually supplied to the R-LED as the light source by the R driver 22. In the first frame of FIG. 4 (3), for example, in the R field, the waveform i1 in which the current value increases by the lowered light quantity in addition to the ordinary current value of FIG. 4 (2) is set in consideration of the light quantity that is lowered by the heat generation in the R-LED. Even in the subsequent G field, the current value is controlled so as to obtain the waveform i2 in which the current value increases by the lowered light quantity in addition to the ordinary current value.

The current waveforms are realized as follows: the CPU 27 reads fixed data previously stored in the program memory 29, expands and stores the fixed data in the main memory 28, and transmits the fixed data to the projection light processing unit 25. The current control unit 25a of the projection light processing unit 25 controls the drive current value of the R driver 22 based on the waveform information.

FIG. 4 (4) illustrates an illuminance that is actually obtained with the illuminance sensor 26R.

Referring to the illuminance measured in the first frame of FIG. 4 (4), the target light quantity can be obtained in the R field. On the other hand, the illuminance that is lower than the target illuminance by $\Delta L1$ is measured in the G field. It is considered that this phenomenon is due to the accumulation of the amount of heat generation of the LED with the progression of the projection operation as described above.

In such a case, the CPU 27 determines that the measured illuminance deviates from the target illuminance set in Step S104, and computes a current-value-adjusted waveform i3 that further cancels the decrease in light quantity $\Delta L1$ in Step S110.

In Step S111, the CPU 27 resets the current-value-adjusted waveform i3 to the current control unit 25a of the projection light processing unit 25 to control the R driver 22. As a result, in the second frame and the frames subsequent thereto, the shortage of illuminance $\Delta L1$ in the G field can be solved to light the R-LED of the LED array 17 with the target illuminance.

The above-described control is performed not only to the R-LED partially constituting the LED array 17 but also to the G-LED and B-LED.

After the processing in Step S111, the count of the timer is cleared in Step S112, and the flow returns to the processing from Step S106.

Thus, in the first embodiment, the influence of the thermal fluctuation of each of the R-, G-, and B-LED groups constituting the LED array 17 that is the light source can be prevented to maintain the quality of the projection image projected through the projection lens unit 21.

Furthermore, in the first embodiment, the information on the current-value-adjusted waveform in starting the projection is previously stored in the program memory 29 in order to cancel the luminous variation of each field period in each color component with respect to the LED array 17 that is the light source, the information on the current-value-adjusted waveform is read in starting the projection and set to the current control unit 25a of the projection light processing unit 25, and the R driver 22, G driver 23, and B driver 24 control the LED array 17. With the progression of the projection operation, each of the illuminance sensors 26R, 26G, and 26B periodically measures the deviation of the LED light quantity. When the deviation is generated, the current-value-adjusted waveform is computed to cancel the deviation, and is set to the current control unit 25a of the projection light processing unit 25 again.

Alternatively, the current-value-adjusted waveform corresponding to the deviation of the LED light quantity measured by each of the illuminance sensors 26R, 26G, and 26B is previously stored in the program memory 29. Then, the current-value-adjusted waveform corresponding to the deviation may be read if needed and set to the current control unit 25a of the projection light processing unit 25, and the R driver 22, G driver 23, and B driver 24 may control the LED array 17.

With the configuration, in the R-, G-, and B-LED groups constituting the LED array 17, even if the light quantity changes easily by the thermal fluctuation, the light quantity can be controlled easily and accurately.

Furthermore, the items of information on the current-value-adjusted waveforms of plural patterns are previously stored in the program memory 29, proper information on the current-value-adjusted waveform is selected and read according to the deviation between the expected illuminance based on the set current-value-adjusted waveforms and the actually measured illuminance. Therefore, it is not necessary to compute the complicated waveform in each case, but the control can be simplified in the projection light processing unit 25.

In the first embodiment, when the light quantity of the light source is measured, the illuminance sensors 26R, 26G, and 26B measure the illuminance from the light source in the micromirror device 16. Therefore, the light quantity of the optical image formed by the micromirror device 16 is directly measured, and the projection image quality can be controlled more correctly.

In the first embodiment, as described above, the illuminance sensors 26R, 26G, and 26B measure the illuminance from the light source in the micromirror device 16. However, the invention is not limited to this. Alternatively, for example, the light quantity may be measured in an output portion of the integrator 19. In this case, it is not necessary to temporarily form the optical image in which the full gray scale is realized in all the R, G, and B pixels of by the micromirror device 16, and the measurement of the light quantity of each of the RGB colors emitted in a time-sharing manner can be performed in parallel an ordinary projection operation.

Second Embodiment

A data projector according to a second embodiment of the invention in which an LED is used as the light source will be described with reference to the drawings.

Figure 5:
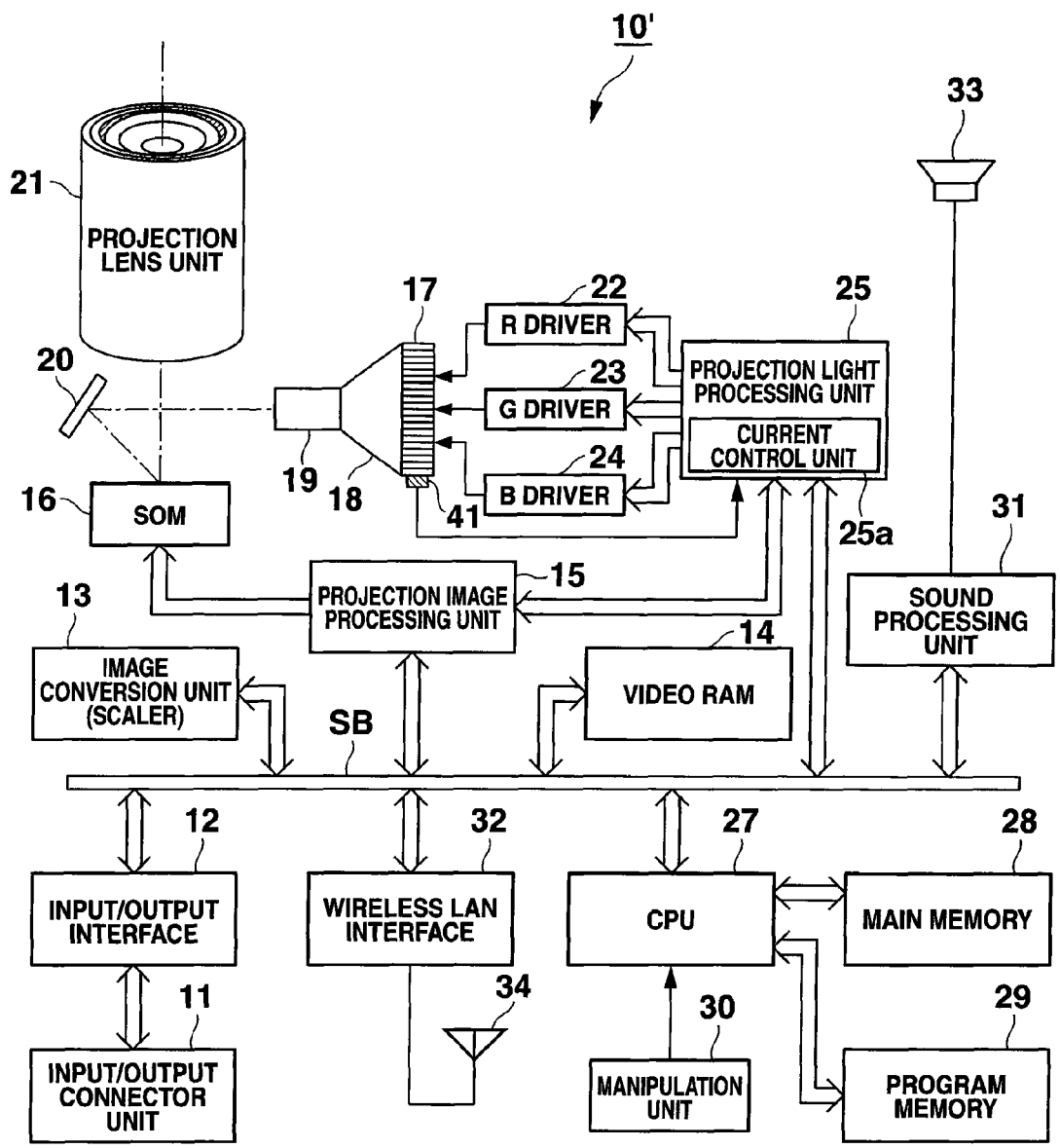
FIG. 5 is a block diagram illustrating a schematic configuration of a functional circuit of a data projector according to a second embodiment of the invention.

FIG. 5 is a block diagram illustrating a schematic functional configuration of an electronic circuit included in a data projector 10' of the second embodiment. Basically, because contents of the electronic circuit of the data projector 10' are similar to those of the data projector 10 of FIG. 1, the same component is designated by the same numeral, and the description is omitted.

In FIG. 5, the illuminance sensors 26R, 26G, and 26B of FIG. 1 are removed, and instead a temperature sensor 41 is provided for the LED array 17. The temperature sensor 41 measures a temperature at the LED array 17, and outputs the temperature as a measurement result to the projection light processing unit 25.

An operation of the second embodiment will be described below.

It is assumed that information on the current value waveform for driving each of R-, G-, and B-LEDs is previously stored in the program memory 29 in each of plural projection color modes.

Figure 6:
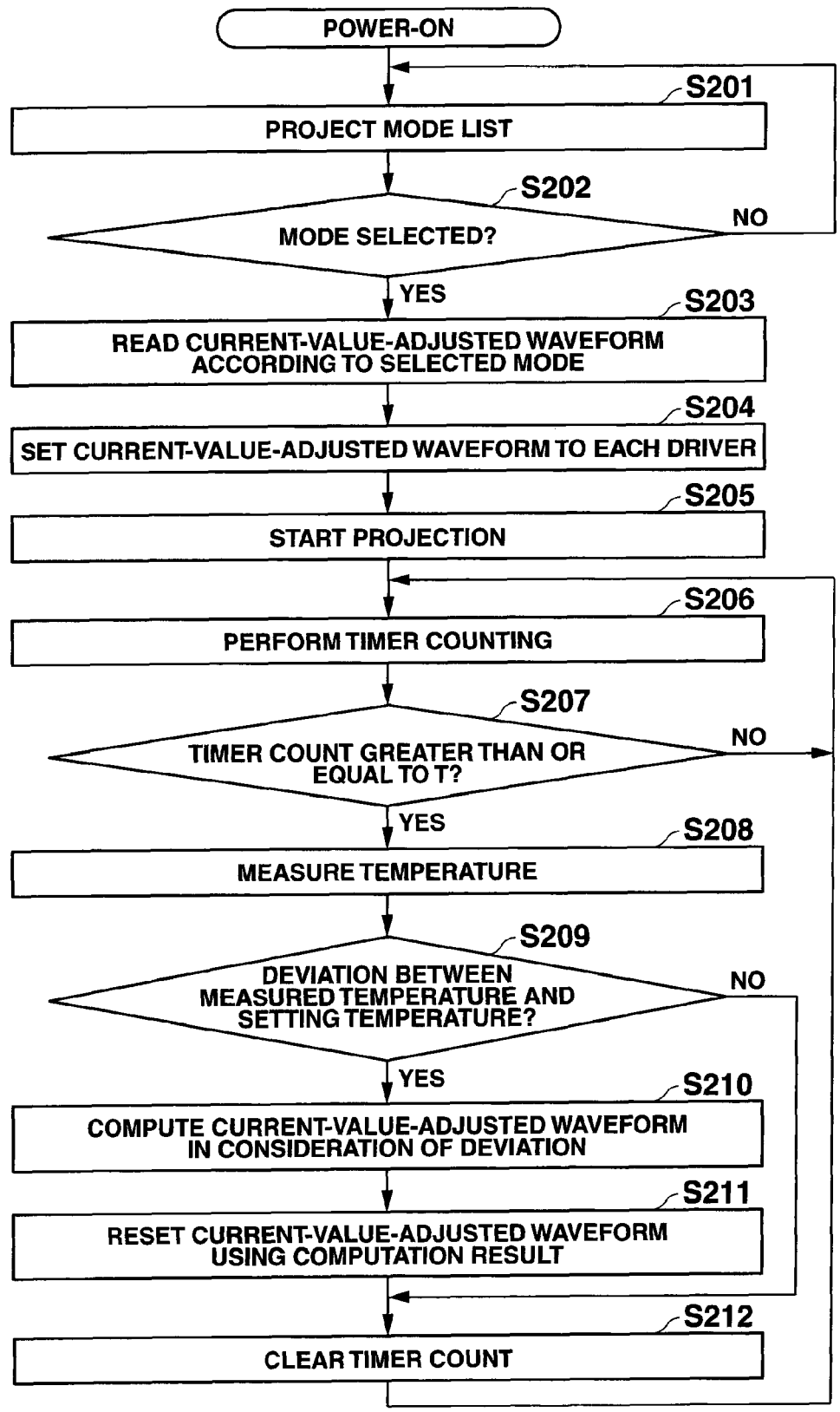
FIG. 6 is a flowchart illustrating processing of a projection operation including a current-value-adjusted waveform of the second embodiment.
Figure 7:
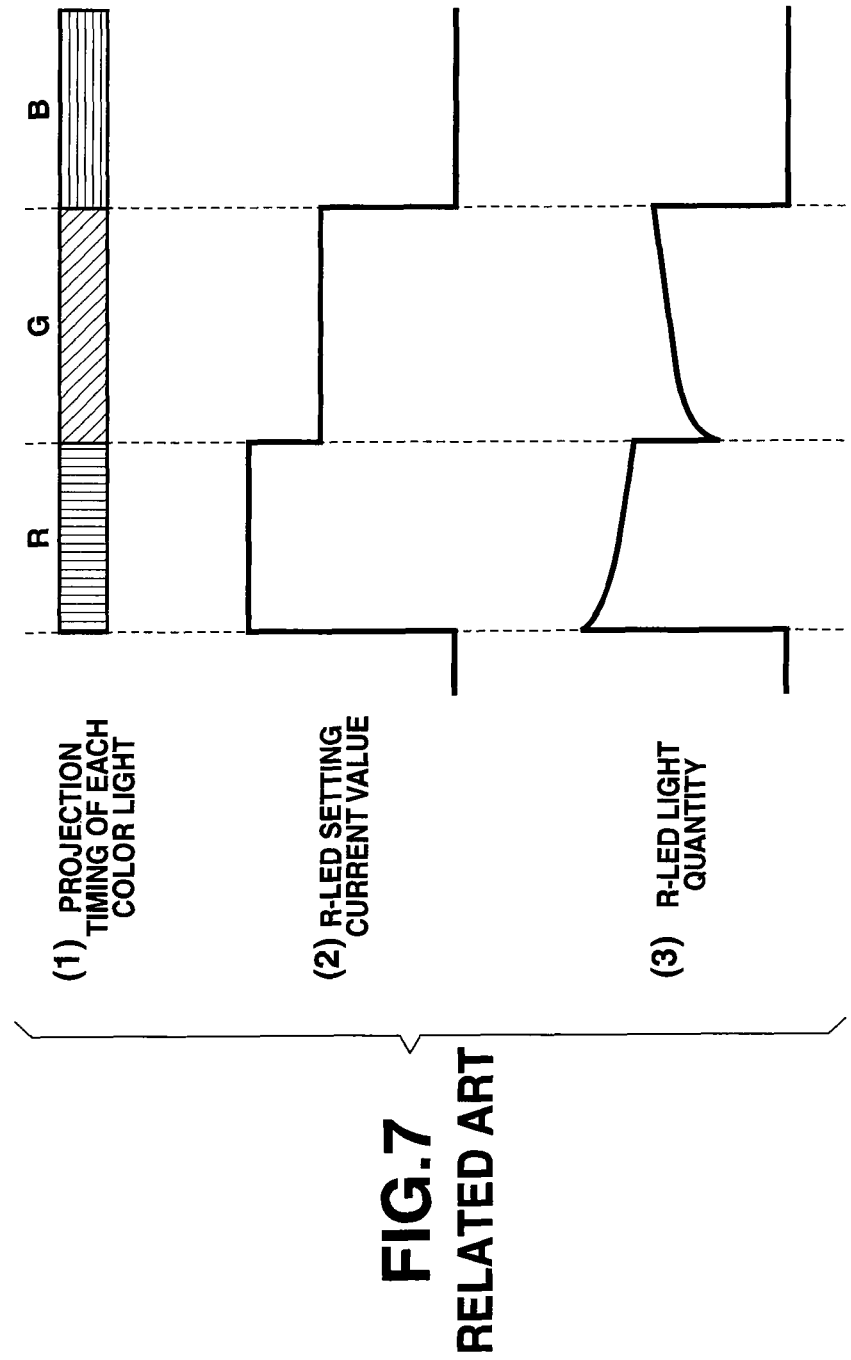
FIG. 7 illustrates a relationship between a drive current value and an amount of luminescence of a general LED light source.

FIG. 6 partially illustrates a projection operation in which, after the data projector 10' is powered on, the CPU 27 reads and expands the operating program stored in the program memory 29, stores the operating program in the main memory 28, and thereafter, executes the operating program.

At first, before the projection of the input image, names of various projection color modes, such as the "theater mode" and the "presentation mode", which express the relationship between the hue and the luminance of the whole projection image are projected as a list image (Step S201).

The CPU 27 determines whether the manipulation for selecting one of the projected modes is performed through the manipulation unit 30 (Step S202). When the manipulation is not performed, the flow returns to Step S201. The processing in Steps S201 and S202 is repeated, and the CPU 27 waits for one of the projection color modes to be selected while the projection color modes are projected as the list.

When one of the projection color modes is selected, the CPU 27 determines the manipulation (Step S202). Then, the CPU 27 selectively reads information on the current value waveform corresponding to each of the R-, G-, and B-LEDs from the program memory 29 according to the selected mode to expand the information on the current value waveform (Step S203). The CPU 27 stores the information on the current value waveform in the main memory 28. Then, the CPU 27 sets the information on the current value waveform stored in the main memory 28 to the current control unit 25a of the projection light processing unit 25 in order to control the R driver 22, G driver 23, and B driver 24 (Step S204).

After the setting, the LED array 17 is driven by the R driver 22, G driver 23, and B driver 24 according to the current value waveform set to the current control unit 25a. At the same time, the projection operation of the image signal fed through the input/output connector unit 11 or the wireless LAN antenna 34 is started (Step S205).

Simultaneously, the CPU 27 causes a timer set in the main memory 28 to start the counting according to the starting of the projection operation (Step S206). The timer counts the constant time T, for example, 30 minutes that is the measurement interval of thermal fluctuation generated with the progression of the projection operation in each of the R-, G-, and B-LED groups constituting the LED array 17. According to the counting of the timer, the CPU 27 determines whether the count becomes the constant value T (Step S207).

When the count of the timer does not reach the constant value T, the flow returns to the processing from Step S206. Then, the processing in Steps S206 and S207 is repeated while the projection operation is performed, whereby the CPU 27 waits for the count of the timer to become the constant value T.

When the count of the timer reaches the constant value T, the CPU determines that the count of the timer has reached the constant value T (Step S207), and the temperature sensor 41 measures the temperature at the LED array 17 at that time (Step S208).

The projection light processing unit 25 determines whether the deviation exists between the measured temperature and the previously set temperature expected as a proper temperature (Step S209).

When the deviation does not exist between the measured temperature and the setting temperature, the CPU 27 clears the count of the timer (Step S212). Then the flow returns to the processing from Step S206.

When the deviation exists between the previously set temperature expected as a proper temperature and the actually measured temperature in Step S209, the CPU 27 computes the current-value-adjusted waveform in consideration of the deviation such that the desired illuminance is realized in each of the R-, G-, and B-LED groups constituting the LED array 17 (Step S210).

Then the CPU 27 reads the information corresponding to the computed current-value-adjusted waveform from the program memory 29, and resets the information to the current control unit 25a of the projection light processing unit 25 (Step S211).

The current-value-adjusted waveform is set to the current control unit 25a of the projection light processing unit 25 again, so that the decrease in illuminance caused by the thermal fluctuation of the LED array 17 can be solved to light the R, G, and B LED groups of the LED array 17 with the setting illuminance.

After the processing in Step S211, the count of the timer is cleared in Step S212, and the flow returns to the processing from Step S206.

Thus, in the second embodiment, the temperature at the LED array 17 is measured with the temperature sensor 41, and the decrease in luminescence caused by the thermal fluctuation of each of the R, G, and B LED groups constituting the LED array 17 is estimated by the deviation between the previously set temperature expected as a proper temperature and the measured temperature.

Therefore, while the change in light quantity of the light source is indirectly measured by the relatively simple configuration, the control can be performed such that the projection image quality is maintained in a higher level.

In the first and second embodiments, the LED array having the R-, G-, and B-LED groups is used as the light source. However, the invention is not limited to this. The invention can also be applied to other light sources such as the semiconductor laser in which the decrease in light quantity is possibly generated by the thermal fluctuation.

In the first and second embodiments, in each color field, LEDs of other color components than the color corresponding to the field are simultaneously lit while the current value decreases. With the configuration, there is an advantage that the projection can be performed with increased light quantity. On the other hand, since the LEDs for each color continuously light in all the fields during the projection operation, the cooling effect due to the non-lighting period based on the time-sharing drive is reduced. As a result, the LEDs for each color influence significantly one another between fields, increasing the accumulation of the heat generation accompanied with an elapsed time of the projection operation.

Even in such a case, according to the above-described embodiments, it is possible to cause the LEDs to light with proper luminance.

On the other hand, obviously the effect of the invention can be exerted in another embodiments. For example, the invention can be performed, when only each R-, G-, and B-LED is lit in the R, G, B fields, or when LEDs of colors other than the corresponding color are lit in a pulsating manner in each of the R, G, and B fields.

Furthermore, in the above-described embodiments, the control for driving the LEDs is executed using current values as a power of the LEDs. Instead, control for driving the LEDs may be executed using voltage values as a power of the LEDs. In this case, the light source may be LDs instead of the LEDs as one embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a plurality of light emitting devices for respectively emitting lights of a plurality of colors;
   a projecting unit configured to form an optical image of a plurality of color components for each of a plurality of frames and sequentially projecting the optical image;
   a power control unit configured to adjust power to be supplied to the plurality of light emitting devices to correct a decrease in luminance due to heat generation in a field period of each of the plurality of light emitting devices;
   a storing unit which stores information for correcting a decrease in luminance due to heat generation in the field period of each of the plurality of light emitting devices, the information including current values of a current waveform corresponding to an elapsed time from a start of light emission of the plurality of light-emitting devices; and
   a selection unit configured to select a projection color mode from among a plurality of projection color modes,
   wherein the current values stored in the storing unit comprise respective current values for each of the plurality of projection color modes,
   wherein the power control unit adjusts each luminance of the plurality of light emitting devices by sequentially supplying the current values stored in the storing unit corresponding to the projection color mode selected by the selection unit, to the plurality of light emitting devices in accordance with the elapsed time from the start of light emission.

2. The projection apparatus according to claim 1, wherein the plurality of light emitting devices are LEDs.

3. The projection apparatus according to claim 1, wherein the power control unit adjusts power to be supplied to the plurality of light emitting devices to cancel the decrease in luminance due to heat generation in the field period of each of the plurality of light-emitting devices.

4. The projection apparatus according to claim 1, wherein the projecting unit controls the plurality of light emitting devices to emit lights of first color components corresponding to color components of the optical image to be projected and simultaneously emit lights of second color components other than the lights of the first color components with a luminance lower than a luminance of the lights of the first color components.

5. The projection apparatus according to claim 4, wherein the power control unit adjusts power to be supplied to one of the plurality of light emitting devices, when a luminance of the one of the light emitting devices is decreased in a change of color components of the optical image sequentially projected by the projecting unit, to gradually increase a luminance of the one of the light emitting devices before the change and to gradually decrease a luminance of the one of the light emitting devices after the change.

6. A projection method for a projection apparatus including a plurality of light emitting devices for respectively emitting lights of a plurality of colors, a projecting unit configured to form an optical image of a plurality of color components for each of a plurality of frames and sequentially projecting the optical image, and a storing unit which stores information for correcting a decrease in luminance due to heat generation in a field period of each of the plurality of light emitting devices, the information including current values of a current waveform corresponding to an elapsed time from a start of light emission of the plurality of light-emitting devices, the method comprising:

adjusting power to be supplied to the plurality of light emitting devices to correct a decrease in luminance due to heat generation in a field period of each of the plurality of light emitting devices; and selecting a projection color mode from among a plurality of projection color modes, wherein the current values stored in the storing unit comprise respective current values for each of the plurality of projection color modes, and wherein adjusting the power comprises adjusting each luminance of the plurality of light emitting devices by sequentially supplying the current values stored in the storing unit corresponding to the selected projection color mode to the plurality of light emitting devices in accordance with the elapsed time from the start of light emission.

7. A non-transitory storage medium storing a program that is executable by a computer in a projection apparatus including a plurality of light emitting devices for respectively emitting lights of a plurality of colors, a projecting unit configured to form an optical image of a plurality of color components for each of a plurality of frames and sequentially projecting the optical image, and a storing unit which stores information for correcting a decrease in luminance due to heat generation in a field period of each of the plurality of light emitting devices, the information including current values of a current waveform corresponding to an elapsed time from a start of light emission of the plurality of light-emitting devices, the program controlling the projection apparatus to perform functions comprising:

adjusting power to be supplied to the plurality of light emitting devices to correct a decrease in luminance due to heat generation in a field period of each of the plurality of light emitting devices; and selecting a projection color mode from among a plurality of projection color modes, wherein the current values stored in the storing unit comprise respective current values for each of the plurality of projection color modes, and wherein adjusting the power comprises adjusting each luminance of the plurality of light emitting devices by sequentially supplying the current values stored in the storing unit corresponding to the selected projection color mode to the plurality of light emitting devices in accordance with the elapsed time from the start of light emission.

8. The projection apparatus according to claim 1, wherein the current waveform is set based on an amount of heat generation accumulated for each field period.

9. The projection apparatus according to claim 1, wherein the storing unit stores the current waveform for each of a plurality of different color components.

* * * * *